(12) United States Patent
Chen

(10) Patent No.: US 7,533,658 B2
(45) Date of Patent: May 19, 2009

(54) COORDINATED CONTROL OF THROTTLE AND EGR VALVE

(75) Inventor: Qian Chen, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 24 days.

(21) Appl. No.: 11/671,945

(22) Filed: Feb. 6, 2007

(65) Prior Publication Data

US 2008/0189027 A1    Aug. 7, 2008

(51) Int. Cl.
F02D 47/08    (2006.01)
F02D 47/10    (2006.01)
(52) U.S. Cl. .................................. 123/568.19
(58) Field of Classification Search ............ 123/568.19, 123/568.22, 568.21, 568.26, 568.12, 361, 123/399
See application file for complete search history.

(56) References Cited

U.S. PATENT DOCUMENTS

| | | | |
|---|---|---|---|
| 6,732,723 B2 * | 5/2004 | van Nieuwstadt | 123/568.19 |
| 7,017,550 B2 * | 3/2006 | Hata et al. | 123/399 |
| 7,062,910 B2 * | 6/2006 | Inoue | 60/605.2 |
| 7,069,905 B1 * | 7/2006 | Livshiz et al. | 123/361 |
| 2003/0075158 A1 * | 4/2003 | Milos et al. | 123/568.21 |
| 2004/0187846 A1 * | 9/2004 | Hoshino et al. | 123/399 |
| 2005/0178123 A1 * | 8/2005 | Uchiyama et al. | 60/605.2 |

OTHER PUBLICATIONS

Michiel van Nieuwstadt, *Coordinated Control of EGR Valve and Intake Throttle for Better Fuel Economy in Diesel Engines*, 2003, SAE Document # 2003-01-0362.

\* cited by examiner

*Primary Examiner*—Mahmoud Gimie

(57) ABSTRACT

An engine control system that includes a throttle and an exhaust gas recirculation (EGR) valve to regulate a mass air flow (MAF) into an engine includes a first module that determines a MAF control command based on a MAF error. A second module determines an EGR valve position based on the MAF control command and a maximum EGR valve range and the throttle resolution. The throttle is fully open and the EGR valve based on the EGR position when the desired MAF is less than the maximum EGR valve range.

6 Claims, 5 Drawing Sheets

COORDINATED CONTROL OF THROTTLE AND EGR VALVE

FIELD OF THE INVENTION

The present invention relates to internal combustion engines, and more particularly to a mass airflow control that coordinates operation of a throttle and an exhaust gas recirculation (EGR) valve.

BACKGROUND OF THE INVENTION

Internal combustion engines combust an air and fuel mixture to generate drive torque. More specifically, air is drawn into the engine and is mixed with fuel. The air and fuel mixture is combusted within cylinders to drive a crankshaft, producing drive torque. Mass airflow into the engine and the quantity of fuel injected determine the amount of drive torque generated.

Some engines include exhaust gas recirculation (EGR) systems to improve engine operation and reduce engine emissions. The EGR system includes an EGR valve that regulates an amount of exhaust gas that is circulated back to the intake manifold to be mixed with the air and fuel. The additional exhaust gas affects the amount of engine air intake through the throttle.

One traditional method of controlling engine air intake includes closed-loop EGR valve control and open loop throttle control. The desired throttle position is scheduled based on an open-loop look-up table. The EGR valve is controlled to regulate the mass airflow into the engine. In order to guarantee the set point can be reached under different conditions, the throttle must close more than is necessary, which results in reduced fuel economy due to excessive throttling.

Another traditional method uses closed-loop control of both the EGR valve and the throttle. The EGR valve and the throttle are controlled sequentially. In the low end of the control authority, where EGR valve itself is sufficient to achieve the intake air set point, only the EGR valve is active, which regulates the airflow to the target value while the throttle is fully open. At the high end of the control authority, where the EGR valve by itself is not sufficient to achieve the desired mass airflow, the EGR valve is fully open and the throttle is actuated. This strategy solves the problem of unnecessary throttling, however, it requires a high precision intake throttle valve and position sensor to accurately control the mass airflow.

SUMMARY OF THE INVENTION

Accordingly, the present invention provides an engine control system that includes a throttle and an exhaust gas recirculation (EGR) valve to regulate a mass air flow (MAF) into an engine. The engine control system includes a first module that determines a MAF control command based on a MAF error. A second module determines a desired EGR valve position based on the MAF control command and a maximum EGR valve range. The throttle is fully open and the EGR valve is regulated to achieve the desired EGR position when the MAF control command is less than the maximum EGR valve range.

In other features, the second module determines a throttle position based on the MAF control command when the MAF control command is greater than the maximum EGR valve range. The second module determines the EGR position based on the throttle position and the MAF control command.

In still other features, a third module determines the MAF error based on a target MAF and an actual MAF. The target MAF is determined based on an engine RPM and a fuel injection quantity into the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
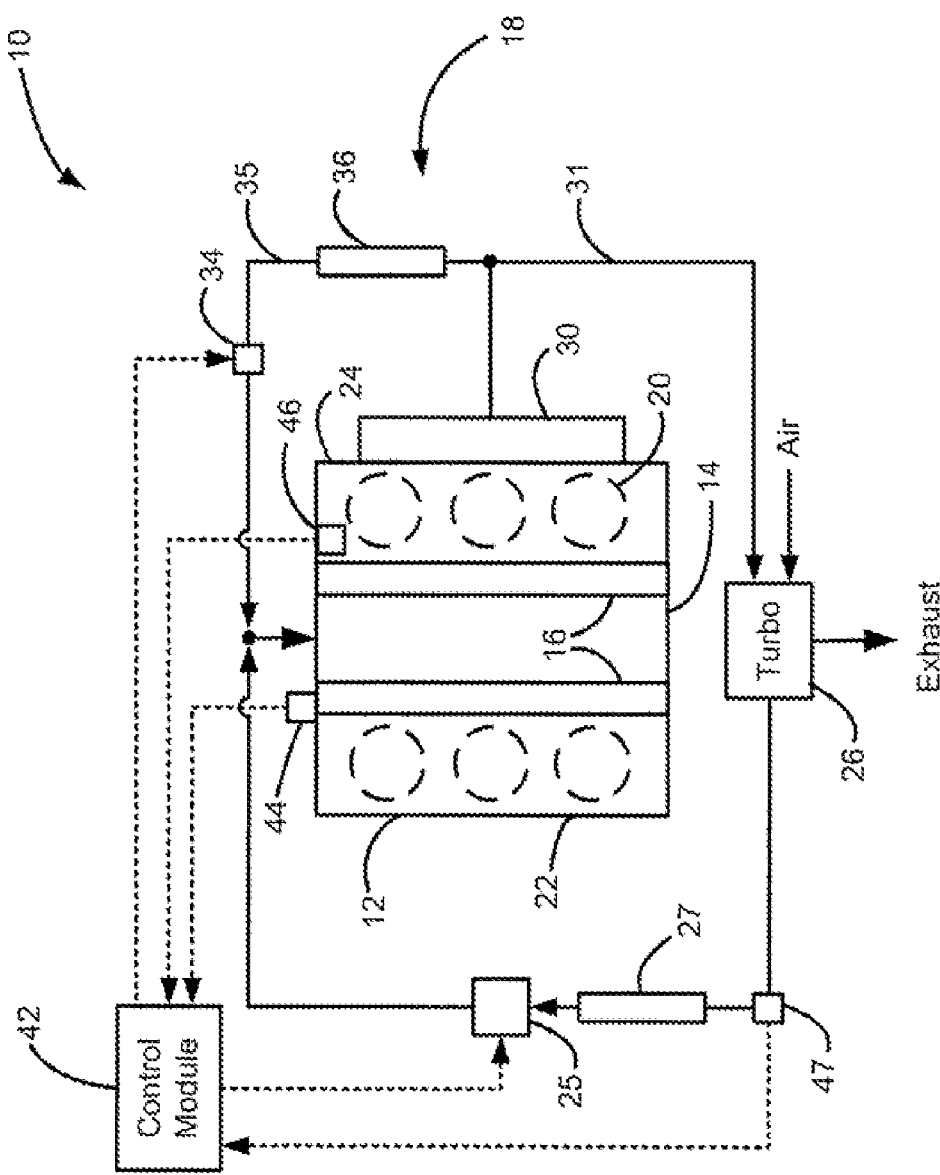
FIG. 1 is a functional block diagram of an exemplary engine system that is regulated based on the coordinated EGR valve and throttle control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is schematically illustrated in accordance with the present invention. The engine system 10 includes an engine 12, an intake manifold 14, a fuel injection system 16 and an exhaust system 18. The exemplary engine 12 includes six cylinders 20 configured in adjacent cylinder banks 22, 24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is further appreciated that the engine 12 is exemplary in nature an inline-type cylinder configuration is also contemplated.

Air is drawn into the intake manifold 14 through a throttle 25 and a filter 27. Air is drawn into the cylinders 20 from the intake manifold 14 and is compressed therein. Fuel is injected by the injection system 16 and the air/fuel mixture is combusted within the cylinders 20. The exhaust gases are exhausted from the cylinders 20 and into the exhaust system 18. In some instances, the engine system 10 can include a turbo 26 that pumps additional air into the cylinders 20 for combustion with the fuel and air drawn in from the intake manifold 14.

The exhaust system 18 includes an exhaust manifold 30, an exhaust conduit 31, an EGR valve 34, an EGR conduit 35 and an EGR cooler 36. The exhaust manifold 30 directs the exhaust from the cylinder banks 22, 24 into the exhaust conduit 31. The EGR valve 34 selectively re-circulates a portion of the exhaust through the EGR conduit 35, as explained in further detail below. The remainder of the exhaust is directed into the turbo 26 to drive the turbo 26. The exhaust stream flows from the turbo 26 to an exhaust after-treatment system (not illustrated).

A control module 42 regulates operation of the engine system 10 based on the coordinated EGR valve and throttle control of the present invention. More specifically, the control module 42 controls operation of both the throttle 25 and the EGR valve 34 to regulate mass air flow (MAF) into the engine 12. The control module 42 communicates with an intake manifold absolute pressure (MAP) sensor 44 and an engine speed sensor 46. The MAP sensor 44 generates a signal indicating the air pressure within the intake manifold 14 and the engine speed sensor 46 generates a signal indicating engine speed (RPM). The control module 42 determines an engine load based on the RPM and fueling rates. The control module 42 also communicates with a mass airflow (MAF) sensor 47 that generates a MAF signal.

The coordinated EGR valve and throttle control of the present invention regulates the EGR valve 34 to control the accuracy of the MAF into the engine 12 while the throttle 25 is used to extend the control range. Because of the higher precision of the EGR valve 34, as compared to the throttle 25, accurate control performance is provided even though a coarse precision throttle 25 is used. While maintaining the control authority of the EGR valve 34, the EGR valve position is kept very close to the fully open position to avoid excessive throttling and to improve fuel economy.

An exemplary EGR valve includes an exemplary MAF range of approximately 0.03 kg/s (i.e., at 100% open) to approximately 0.067 kg/s (i.e., at 0% open). The exemplary EGR valve can be adjusted in approximately 0.1% increments with an exemplary MAF change of approximately 0.00003 kg/s per increment (i.e., per 0.1% change in EGR position). It is appreciated, however, that the EGR valve resolution is not always linear to the MAF change between the minimum and maximum EGR positions. An exemplary throttle includes an exemplary MAF range of approximately 0 kg/s (i.e., at 0% closed throttle) to approximately 0.03 kg/s (i.e., at 0% closed throttle). The exemplary throttle can be adjusted in approximately 2% increments with an exemplary MAF change of approximately 0.0006 kg/s per increment (i.e., per 2% change in throttle position). It is appreciated, however, that the throttle resolution is not always linear to the MAF change between the minimum and maximum throttle positions.

MAF corresponds to the fresh air flowing through the throttle 25 into the engine 12. Although only exhaust gas passes through the EGR valve 34, the EGR valve 34 indirectly controls MAF. More specifically, when the EGR valve 34 is opened, the EGR flow into the engine 12 increases. Consequently, the MAF is limited/reduced because total fluid flow (i.e., fresh air and exhaust gas combined) into the engine 12 is nearly constant. When the EGR valve 34 is fully open (e.g., 100%), the MAF through the throttle 25 is at its lowest point. If it is desired to further reduce the MAF, the throttle 25 is moved toward a closed position. In most cases, the throttle 25 is fully open.

In general, the coordinated EGR valve and throttle control regulates the throttle position ($POS_{THR}$) and the EGR valve position ($POS_{EGR}$) based on a MAF error ($MAF_{ERR}$), which is determined based on a target MAF ($MAF_{TRG}$) and an actual MAF ($MAF_{ACT}$). $MAF_{TRG}$ is determined from a pre-stored look-up table based on engine RPM and the injected fuel quantity and $MAF_{ACT}$ is determined based on the MAF sensor signal. The control outputs are no longer desired MAF, but are command signals to the throttle 25 and the EGR valve 34, which are interpreted as desired positions, in the unit of %, thereof.

The coordinated EGR valve and throttle control initially generates a control signal or MAF control command ($MAF_{CTL}$) based on a $MAF_{ERR}$. $MAF_{CTL}$ can vary from 0 to 200%, for example. If $MAF_{CTL}$ is less than the maximum achievable EGR valve range ($POS_{EGRMAX}$) (e.g., 100%), only the EGR valve 34 is controlled and the throttle 25 is fully open. For example, if $MAF_{CTL}$ is 75%, which is less than $POS_{EGRMAX}$ of 100%, $POS_{EGR}$ is set equal to 75% and $POS_{THR}$ is set equal to 0% closed, which corresponds to a fully open throttle.

If $MAF_{CTL}$ is greater than $POS_{EGRMAX}$ of 100%, the difference between $MAF_{CTL}$ and $POS_{EGRMAX}$ ($\Delta X$) is calculated. $POS_{THR}$ and $POS_{EGR}$ are determined based on $\Delta X$ and the resolution of the throttle 25. The position commands are determined in such a way that $POS_{THR}$ is determined at multiples of the resolution of the throttle 25 (i.e., any $POS_{THR}$ value finer than the resolution is ignored), and that control of the EGR valve 34 is based on the residual value. In this manner, $POS_{EGR}$ is less than $POS_{EGRMAX}$ to maintain the control authority of EGR valve 34, but is as close as possible to $POS_{EGRMAX}$ to minimize throttling.

For example, if $MAF_{CTL}$ is 124.5%, which is greater than 100%, the throttle 25 needs to be activated. For an exemplary throttle resolution of 2% (i.e., throttle 25 is adjusted in 2% increments), $POS_{THR}$ is set equal to 26%, and $POS_{EGR}$ is set equal to 98.5%. In this manner, the sum of $POS_{THR}$ and $POS_{EGR}$ equals $MAF_{CTL}$. For an exemplary throttle resolution of 1% (i.e., throttle 25 is adjusted in 1% increments), $POS_{THR}$ is set equal to 25%, and $POS_{EGR}$ is set equal to 99.5%.

Figure 2:
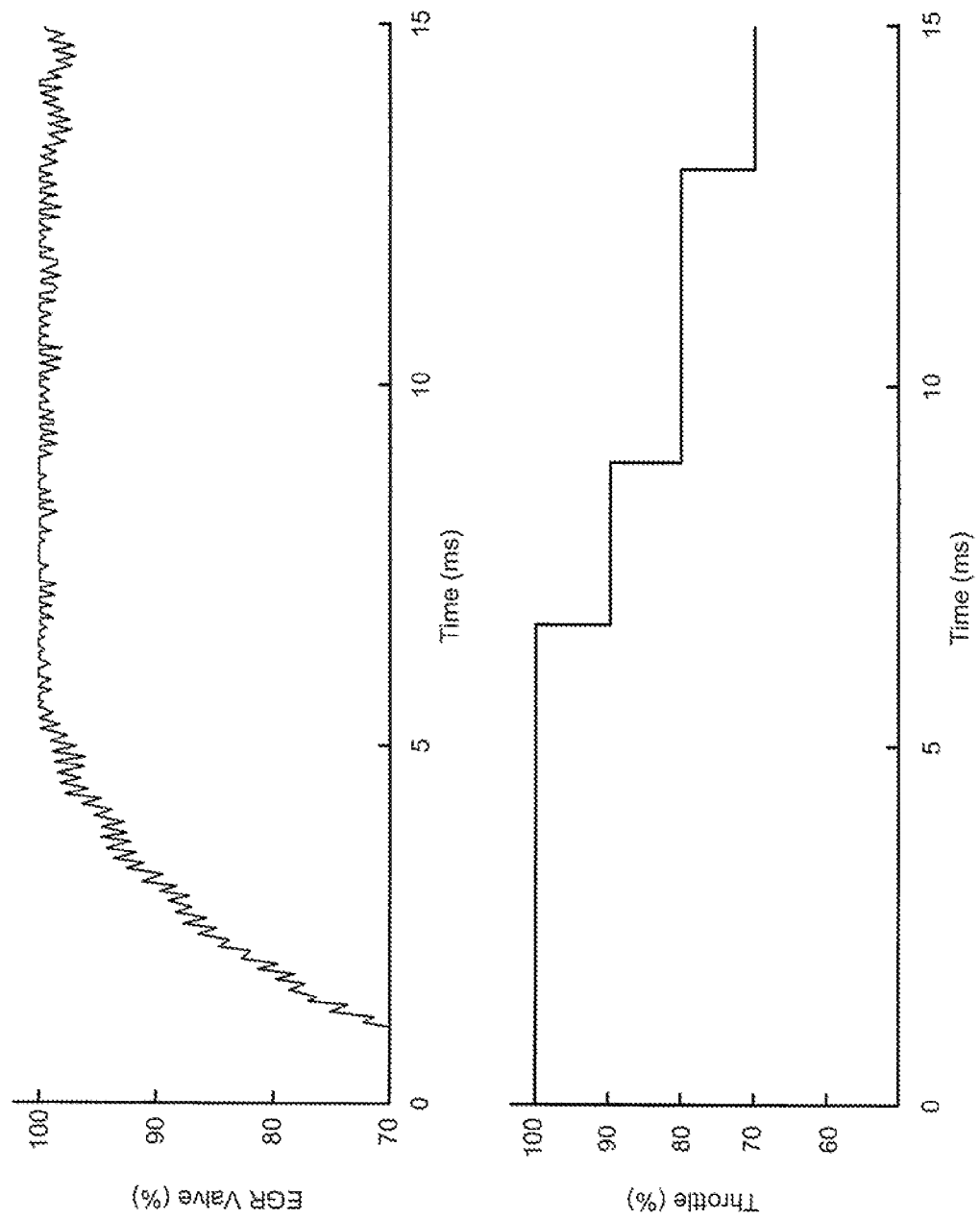
FIG. 2 illustrates exemplary EGR valve and throttle traces using the coordinated EGR valve and throttle control of the present invention.

Referring now to FIG. 2, exemplary EGR valve position and throttle position traces are illustrated and are based on the coordinated EGR valve and throttle control of the present invention. Initially, the throttle 25 is fully open, because the EGR valve 34 is not fully utilized, and the EGR valve 34 alone regulates mass airflow. When the EGR valve 34 is fully utilized (i.e., at $POS_{EGRMAX}$), the throttle 25 starts to close to extend the operating range of the EGR valve 34. While the throttle 25 is active, the EGR valve 34 is used to accurately control MAF. Because the throttle 25 is only controlled at discrete positions, a less expensive, coarse precision throttle is sufficient and does not affect the control performance.

Figure 3:
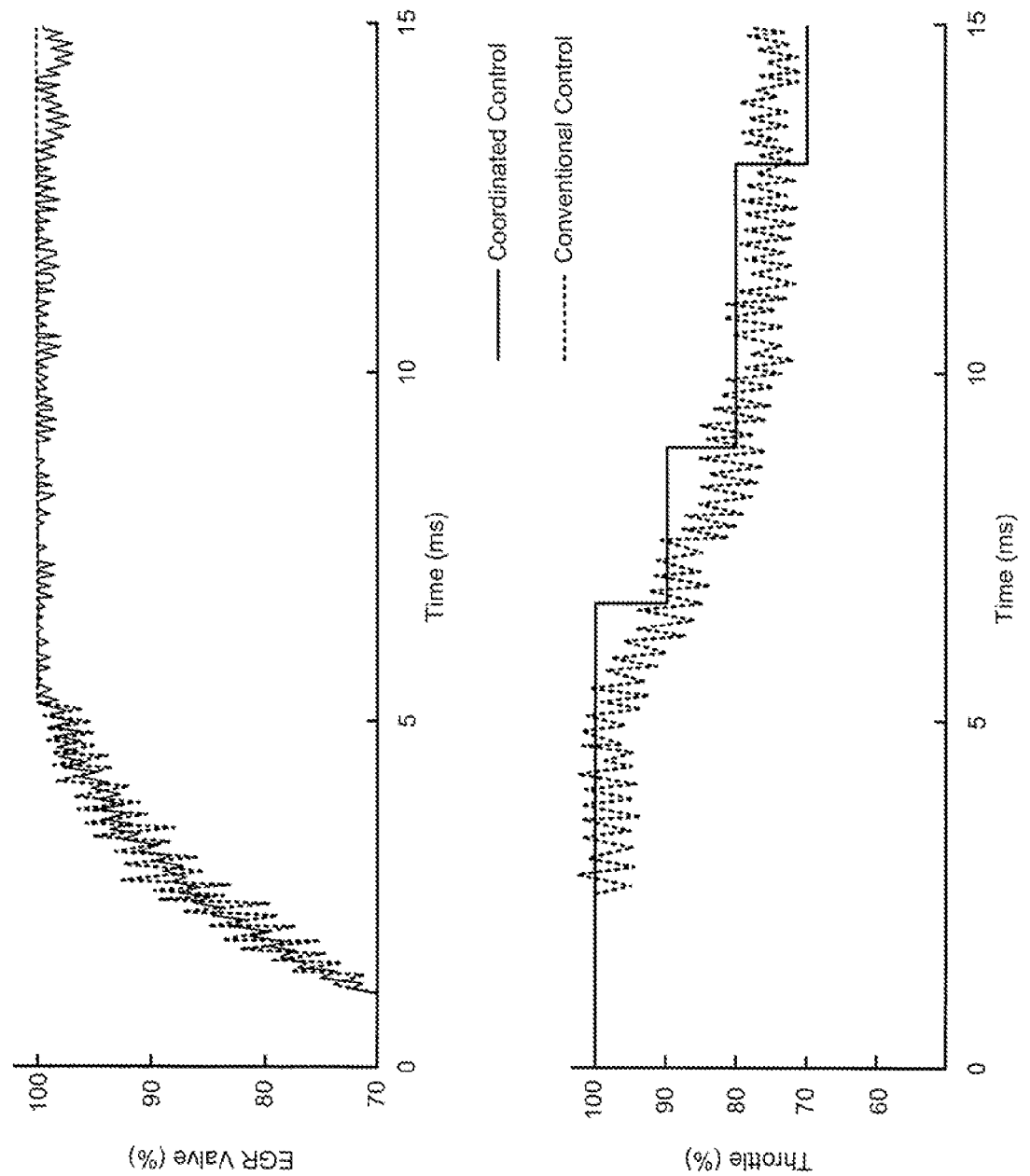
FIG. 3 illustrates exemplary EGR valve and throttle traces comparing the coordinated EGR valve and throttle control of the present invention to a conventional mass airflow (MAF) control.

Referring now to FIG. 3, exemplary EGR valve position and throttle position traces using a conventional control are illustrated and are laid over the EGR valve position and throttle position traces of FIG. 2 for comparison purposes. As can be seen, the difference in the EGR valve positions is small (e.g., less than approximately 3%). Similarly, the difference in the throttle positions is also small (e.g., less than the resolution of the coarse precision throttle). As a result, the coordinated EGR valve and throttle control enables use of a less, expensive, coarse throttle and results in less throttling activity.

Figure 4:
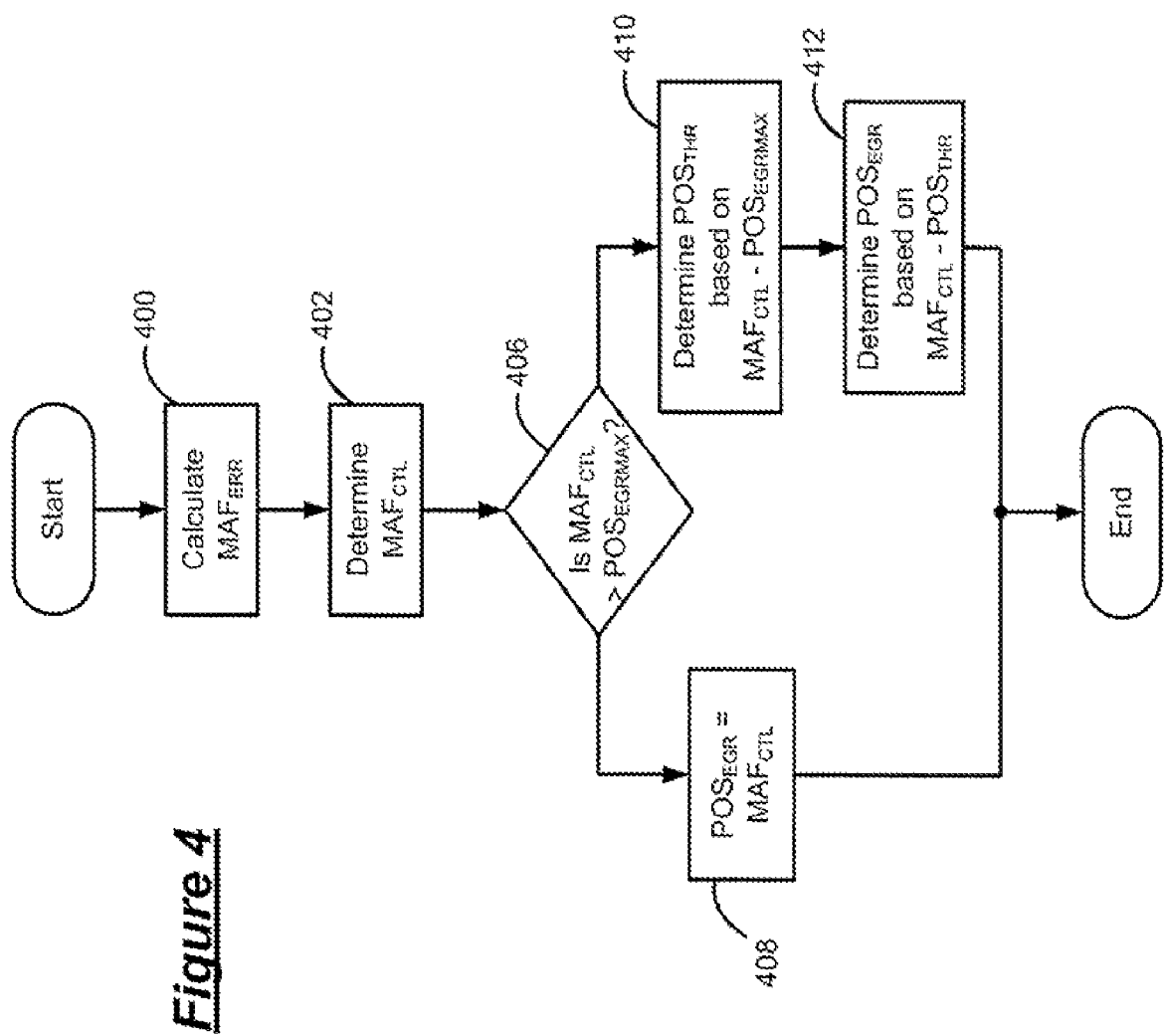
FIG. 4 is a flowchart illustrating exemplary steps executed by the mass airflow control of the present invention.

Referring now to FIG. 4, exemplary steps executed by the coordinated EGR valve and throttle control. In step 400, control calculates $MAF_{ERR}$ based on $MAF_{TRG}$ and $MAF_{ACT}$. In step 402, control determines $MAF_{CTL}$ based one engine RPM and fuel injection quantity.

In step 406, control determines whether $MAF_{CTL}$ is greater than $POS_{EGRMAX}$. If $MAF_{CTL}$ is not greater than $POS_{EGRMAX}$, control sets $POS_{EGR}$ equal to $MAF_{CTL}$ in step 408 and control ends. In this manner, the throttle 25 remains fully-open and the EGR valve 34 is adjusted to achieve $POS_{EGR}$. If $MAF_{CTL}$ is greater than $POS_{EGRMAX}$, control determines $POS_{THR}$ based on the difference between $MAF_{CTL}$ and $POS_{EGRMAX}$ in step 410. In step 412, control determines $POS_{EGR}$ based on the difference between $MAF_{CTL}$ and $POS_{THR}$ and control ends. In this manner, the throttle 25 is adjusted to achieve $POS_{THR}$ and the EGR valve 34 is adjusted to achieve $POS_{EGR}$.

Figure 5:
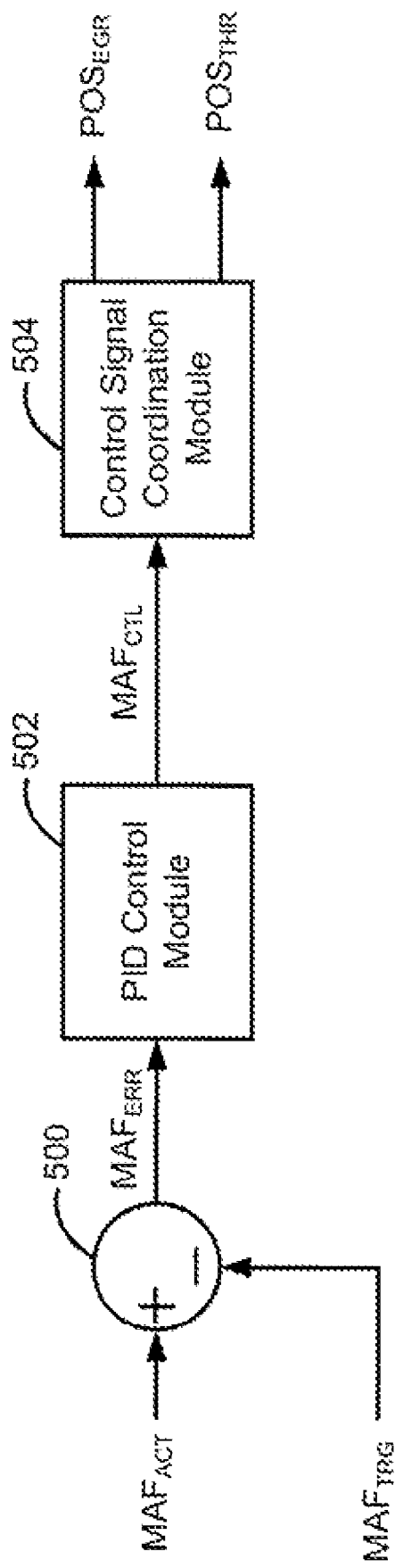
FIG. 5 is a functional block diagram of exemplary modules that execute the MAF control of the present invention.

Referring now to FIG. 5, exemplary modules that execute the coordinated EGR valve and throttle control will be described in detail. The exemplary modules include a summer 500, a PID control module 502 and a control signal coordination module 504. The summer 500 determines $MAF_{ERR}$ as the difference between $MAF_{TRG}$ and $MAF_{ACT}$. The PID control module 502 determines $MAF_{CTL}$ based on $MAF_{ERR}$. The control signal coordination module 504 determine $POS_{EGR}$ and $POS_{THR}$ based on $MAF_{CTL}$. The EGR valve 34 and the throttle 25 are controlled to achieve $POS_{EGR}$ and $POS_{THR}$, respectively.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mass air flowrate (MAF) control system comprising:
 a throttle that opens to a predetermined number of throttle openings including a maximum throttle opening;
 an exhaust gas recirculation (EGR) valve;
 a first module that determines a MAF command based on a MAF error; and
 a second module that opens said throttle to said maximum throttle opening and adjusts said EGR valve based on said MAF command when said MAF command is less than a maximum EGR opening and that, when said MAF command is greater than said maximum EGR opening:
  determines an intermediate throttle opening based on a difference between said MAF command and said maximum EGR opening;
  adjusts said throttle based on a nearest one of said predetermined number of throttle openings that is greater than said intermediate throttle opening; and
  adjusts said EGR valve based on a difference between said MAF command and said nearest one of said predetermined number of throttle openings that is greater than said intermediate throttle opening.

2. The control system of claim 1 further comprising a third module that determines said MAF error based on a target MAF and an actual MAF.

3. The control system of claim 2 wherein said target MAF is determined based on an engine RPM and a fuel injection quantity into said engine.

4. A method of controlling a mass air flowrate (MAF) into an engine system, comprising:
 determining a MAF command based on a MAF error;
 opening a throttle to a maximum throttle opening and adjusting an exhaust gas recirculation (EGR) valve based on said MAF command when said MAF command is less than a maximum EGR opening; and,
 when said MAF command is greater than said maximum EGR opening:
  determining an intermediate throttle opening based on a difference between said MAF command and said maximum EGR opening;
  adjusting said throttle based on a nearest one of a predetermined number of throttle openings that is greater than said intermediate throttle opening; and
  adjusting said EGR valve based on a difference between said MAF command and said nearest one of said predetermined number of throttle openings that is greater than said intermediate throttle opening.

5. The mehtod of claim 4 further comprising determining said MAF error based on a target MAF and an actual MAF.

6. The method of claim 5 further comprising determining said target MAF based on an engine RPM and a fuel injection quantity into said engine.

\* \* \* \* \*